United States Patent [19]

Krygeris et al.

[11] 4,085,402

[45] Apr. 18, 1978

[54] MULTIPLEXING OF ACTUATOR CONTROL SIGNALS

[75] Inventors: Algirdas J. Krygeris, Richmond Heights; John M. Manring, Cleveland Heights, both of Ohio

[73] Assignee: Harris-Intertype Corporation, Cleveland, Ohio

[21] Appl. No.: 582,713

[22] Filed: Jun. 2, 1975

Related U.S. Application Data

[63] Continuation of Ser. No. 378,832, Jul. 13, 1973, abandoned.

[51] Int. Cl.[2] .............. H04Q 9/00

[52] U.S. Cl. .............. 340/163; 340/147 R; 340/147 P

[58] Field of Search .............. 101/365; 340/163, 147 R, 340/147 P, 147 MT, 325; 235/151.2, 151.21, 151.22

[56] References Cited

U.S. PATENT DOCUMENTS

| | | | |
|---|---|---|---|
| 3,110,013 | 11/1963 | Breese | 340/168 R |
| 3,166,742 | 1/1965 | Sherwin | 340/325 X |
| 3,230,508 | 1/1966 | Grijseels | 340/325 X |
| 3,491,354 | 1/1970 | Tschumi | 340/325 X |
| 3,585,595 | 6/1971 | Scauin | 340/163 |
| 3,614,765 | 10/1971 | Huber | 340/325 X |
| 3,747,524 | 7/1973 | Crum | 101/365 |
| 3,774,536 | 11/1973 | Raymond | 101/207 |
| 3,866,216 | 2/1975 | Tschumi | 340/325 X |

*Primary Examiner*—Harold I. Pitts

[57] ABSTRACT

An apparatus for remote control of a printing press having a plurality of printing units each having a number of ink fountain key actuators, avoids duplication of remote control circuitry and of wiring by multiplexing a small number of remote controls and control wires. Command data are produced at a remote station, and temporarily stored there. Command data for all of the printing units which are to be controlled are then transmitted as a serial data stream over a pair of wires to storage registers located at the printing press. Thereafter, all of the actuators are energized in accordance with the data stored in their respective registers. A complete serial data stream is transmitted to the press once for each AC cycle of the power line frequency, and the actuators move in accordance with every such transmission of data. After a predetermined time interval, during which the identical serial data stream is repeatedly transmitted, the command data which is stored at the remote control station is replaced by freshly computed data, and the entire cycle is repeated.

8 Claims, 6 Drawing Figures

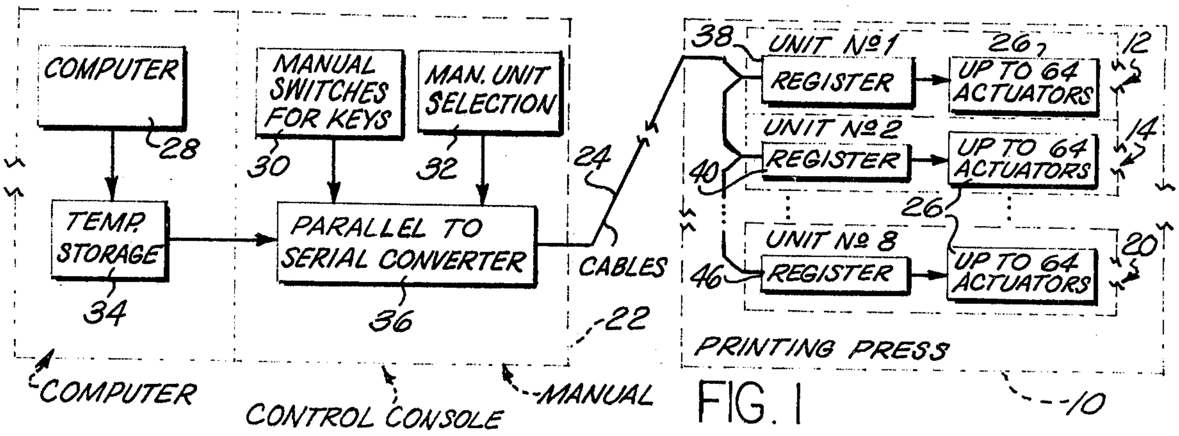
FIG. 1
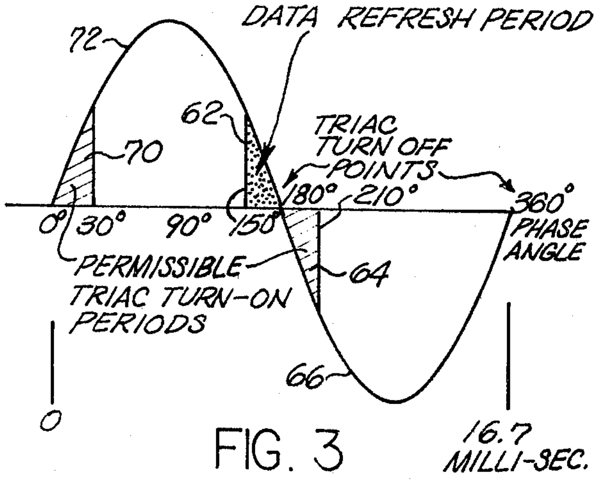
FIG. 3
FIG. 2
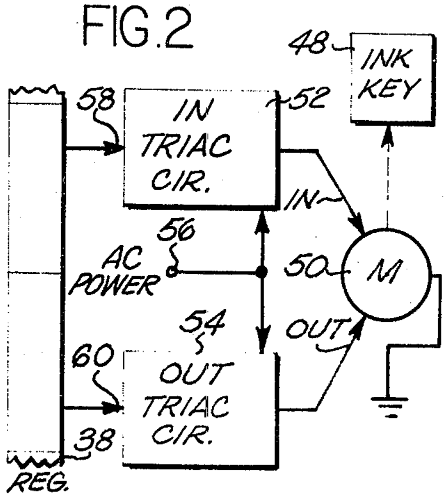
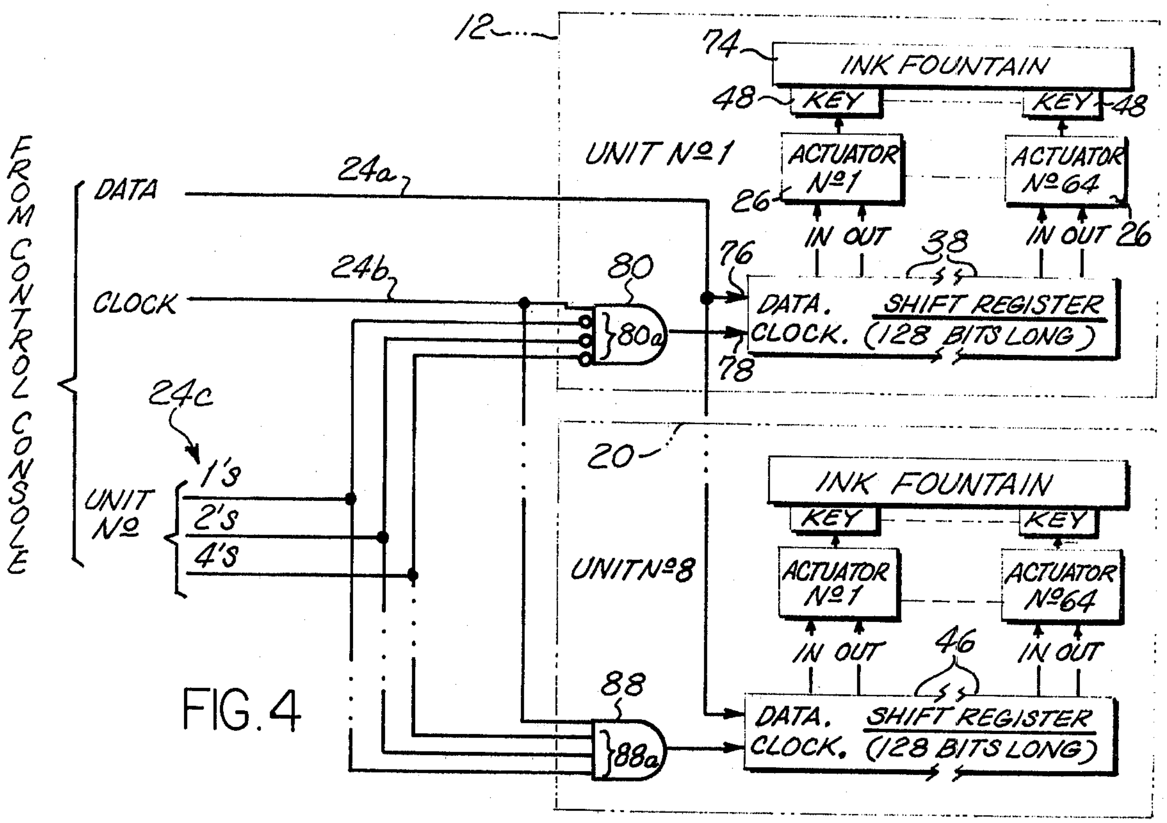
FIG. 4

MULTIPLEXING OF ACTUATOR CONTROL SIGNALS

This is a continuation of application Ser. No. 378,832, filed July 13, 1973, now abandoned.

BACKGROUND OF THE INVENTION

Printing presses such as lithographic offset presses ofter have a plurality of printing units which may be used for printing a plurality of colors on paper or other stock. An ink fountain for a printing unit of such a press typically includes a source of ink and a number of inking rolls extending across the width of the printing press transversely to the direction of travel of the stock to be printed. The rate of flow of ink from the ink fountain toward the stock is controlled at many locations across the width of the ink fountain in order to produce uniformly dense printed images across the width of the stock. It is not uncommon for each ink fountain to have as many as 64 such locations across its width, at which the rate of ink flow can be individually adjusted by 64 movable members. The movable members, which in one type of ink fountain are ink adjustment keys having screw threads, are adjustable by separate actuators which include bidirectional electric motors.

In one ink fountain of the prior art, each of the ink key actuators is arranged to be driven by two triac semiconductors, one for each rotational direction of the ink key. For remotely controlling the ink fountains of all of the printing units of a printing press, a remote control station was provided at an inspection table at a distance from the printing press. An individual control wire was brought out from a gate electrode of each of the triac semiconductors and connected at its other end to control devices at the remote control station. This control wiring scheme could be classed as "parallel" control because of the arrangement of similar control circuits that were connected between the remote control station and the printing press. Such a "parallel" control system results in duplication of circuits and duplication of cabling, which entails a great amount of equipment when a great number of ink key actuators on a multiple unit printing press are to be controlled.

Some ink fountain control apparatus of the prior art had provision for controlling only one printing unit at a time from the remote control station and had further provision for using that one set of controls in common for all of the printing units by switchably multiplexing the controls to operate a selected one of the printing units. The multiplexing was accomplished by switching the available controls to a selected set of the "parallel" control wires described above. Thus, some control systems of the prior art have succeeded in multiplexing the remote control devices but not the interconnecting cable extending between the remote control station and the printing press.

SUMMARY OF THE INVENTION

The present invention significantly reduces the amount of wiring between the remote control station and the printing press and reduces the numbers of certain active circuits by employing serial data transfer from the remote control station to the printing press units. Command signal data is generated at the remote control station and temporarily stored in data registers that are located there. The command signals are then converted to a serial data stream and transmitted over one wire or very few wires extending from the remote control station to the printing press.

Each printing unit of the printing press is equipped with a data storage register having two binary stages for each actuator of the ink fountain. Command data for all of the actuators of the last, i.e. highest-numbered, printing unit is transmitted first in the serial data stream, after which commands are transmitted for the next-to-last printing unit, etc. until commands have been issued for all of the printing units whose actuators are to be controlled.

At the printing press, the first portion of the serial data stream, which is the portion relating to the last printing unit, is steered into a storage register of the last printing unit; the second portion is steered to a storage register for the next-to-last printing unit, and so forth. The steering is accomplished by gate circuits under the control of directional signals that are produced at the remote control station and transmitted over a few binary control wires to the printing press. When the entire data stream has been received and stored at the press, all of the actuators which are to be controlled in this particular control interval are operated (or else held stationary) in accordance with the command data stored in the press-mounted register corresponding to that respective actuator.

The data stored at the remote station are nondestructively read and transmitted anew from the remote station to the printing press once for every cycle of the power frequency. The data registers at the printing unit store the command information for only one cycle of the power line frequency, which is a control interval. The entire information array at the printing press is therefore refreshed 60 times per second, for a system having power line frequency of 60 Hz.

The command data stored at the remote control station may be transmitted to the printing press a number of times before the remote station information is updated by the computer. For example, the actuators may be operated for a dozen control intervals in accordance with one set of command data stored at the remote station, and then operated for the next dozen control intervals according to new data at the remote station, and so forth.

Where triacs are used at the actuators, a triggering voltage can be present at the triacs' gate electrodes long enough, with the present invention, that the triacs can be turned on reliably. This would not be possible with pulses of microsecond duration, such as would be required by a data transmission rate which could service all of the key actuator motors on the press during the first 30° of each half-cycle of line voltage. The triacs must be gated within the first 30° of each half-cycle in order for the actuator motors to develop full torque for the half-cycle.

Very few wires are required between the remote control station and the printing press, even though, with the actuators being remotely controlled upon every cycle of the power line frequency, a high degree of control is accomplished.

Accordingly, one principal object of the present invention is to provide apparatus for controlling a plurality of actuators of a printing press from a remote station, in which command data for each actuator is prepared at the remote station and transmitted serially to the press over conductors which are used in common for all of the actuators, and in which the command data is stored temporarily thereafter at the printing press and utilized for selectively energizing the actuators for movement through a predetermined increment of travel.

Another object is to provide apparatus for controlling a plurality of actuators as above and in which the command data consists of one bit of data for each direction of movement of each actuator.

Another object is to provide apparatus as above in which the data is received serially in shift registers at the press for storage, and is emitted in parallel therefrom for energizing the actuators.

A further object is to provide apparatus as above in which the actuators are energized by triac semiconductors which are triggered by triggering signals of much longer duration than the original respective command data which was serially transmitted from the remote control station to the press.

Yet another object is to provide apparatus as above and in which data storage means is also provided at the remote control station, for temporarily storing the command data there.

A further principal object of the invention is to provide apparatus for remote control of a printing press having a plurality of printing units each having a multiplicity of actuators and in which the actuators are controlled by command data which is serially transmitted from a remote control station to a register at each of the printing units, and in which, moreover, identifying signals are produced for steering the command data that relates to each printing unit into the particular data storage register, at the press, that is associated with the related printing unit.

Other objects include providing an apparatus as above in which two bits of command data are provided per actuator, in which operation of the actuators is synchronized with transmissions of the data stream from the remote control station, and in which the transmissions occur in synchronism with an AC power line, and in which the command generating means automatically recycles successively.

A further object is to provide a method for controlling a plurality of actuators of a printing press from a remote station, involving the steps of establishing command data, transmitting the command data serially on conductors used in common for all actuators from the remote station to the printing press where it is stored, and operating the actuators in accordance with the data through one constant incremental amount of travel.

A still further object is to provide a method as immediately above and in which not more than one binary digit of command data is employed for each direction of movement for each actuator.

BRIEF DESCRIPTION OF THE DRAWINGS

The foregoing and other objects and features of the present invention will become more apparent upon consideration of the following description taken in conjunction with the accompanying drawings wherein:

FIG. 1 is a block diagram of a portion of a multiple unit printing press and remotely located computer and manual control for it;

FIG. 2 is a block diagram showing an ink key actuator;

FIG. 3 shows one complete cycle of a power line voltage which is applied to ink key actuators of the printing press;

FIG. 4 is a block diagram of portions of the control apparatus that are located at the printing units;

DESCRIPTION OF A PREFERRED EMBODIMENT OF THE INVENTION

Figure 5:
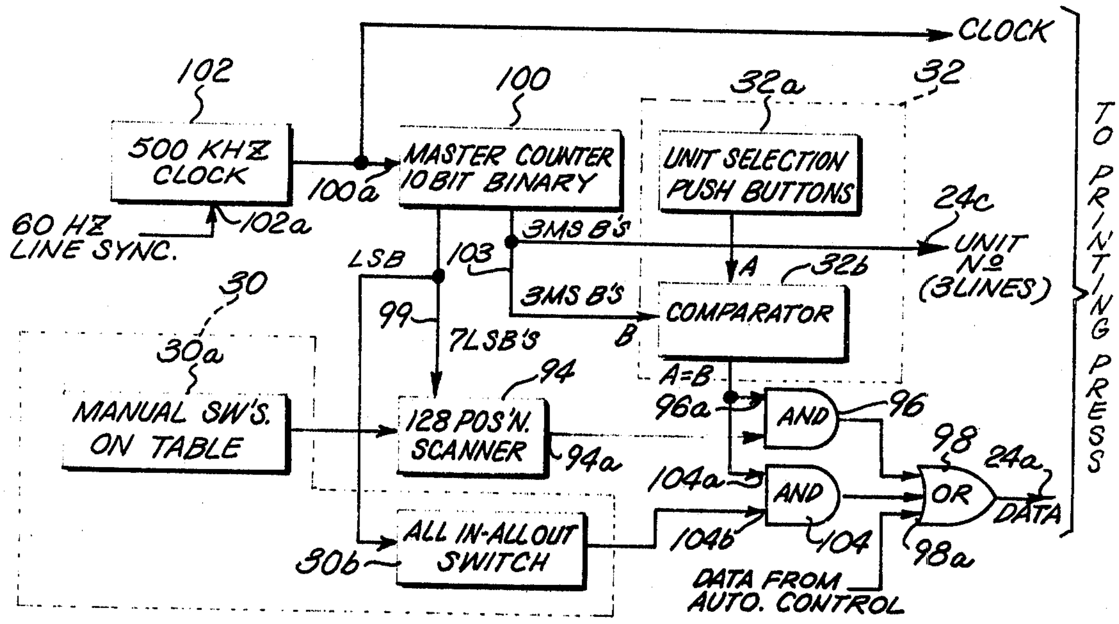
FIG. 5 is a block diagram of manual control portions and synchronizing portions of the control apparatus that are located at the remote control station.

In a preferred embodiment of the invention a printing press 10 having eight printing units, 12, 14, . . . 20 is controlled from a control console 22 which is at a location remote from the printing press 10, FIG. 1. The control console 22 and the printing press 10 are interconnected by control cables 24. Each of the printing units, such as unit 12 for example, has an ink fountain extending transversely across its width from which ink first flows to inking rolls of the printing unit and is later applied to paper being printed. The flow of ink from the fountain to the ink rolls is controlled at 64 different lateral locations across the width of the ink fountain by 64 ink control keys, each of which is drivable by a bidirectional actuator 26 to various settings to admit more or less ink to the ink rolls from the fountain at each of the 64 transverse locations.

The control console 22 has two sources of command information for the ink key actuators 26, namely, a computer 28 which ordinarily is responsive to automatic feedback signals from the printing press 10, and manually operable switches 30, 32 located at an inspection table portion of the control console 22.

Commands generated by the computer 28 are stored temporarily in a data storage register 34 (FIG. 1) and converted to a serial data stream by a parallel to serial converter 36. The serial data stream is transmitted through the cables 24 to data storage registers 38, 40, . . . 46, one of which is associated respectively with each of the eight printing units.

Data for the last or highest-numbered printing unit, and the highest numbered key thereof, is transmitted first in the bit stream. This is done so that, for less than the maximum number of printing units (8), or less than the maximum number of bidirectional actuators per unit (64), on a given press installation, the unused portion of the fixed-length bit stream "spills out" of the end of the shift registers at the remote station with only the useful portion of the bit stream, which is transmitted last, remaining in the shift register. As a result, the electrical circuitry at the remote station is essentially the same for all press configurations which in this example is up to the maximum of 8 units, and 64 actuators per unit.

A first portion of the data stream is steered into the last register 46 for purposes of controlling unit 20. A second portion of the data stream is directed to another register at the press for storage therein for use in controlling the actuators of the next-to-last printing unit, and so forth for the remaining printing units. When the ink fountains are in an automatic mode of control in which the computer 28 controls the positions of the ink keys, all eight of the printing units receive a complete set of commands from the control console upon every transmission of the serial data train. When the ink fountains are being controlled manually from the control console by the switches 30, 32, each serial data train contains data for only one of the printing units, that is, whichever unit was selected by the manual unit selection switches 32. The serial data trains are transmitted 60 times per second for printing press installations in which the main power line frequency is 60 Hz. The actuators 26 respond to every transmission of the serial data train, to move the ink keys in one direction or another or to remain stationary.

The actuators 26 include motors and triac semiconductor circuits, FIG. 2. Each of the ink keys 48 has screw threads which engage screw threads on a stationary frame of the printing unit, and the key is arranged to be rotationally driven by a bidirectional motor 50. The motor 50 can be energized selectively by either of two triac circuits 52, 54, one of which is employed for driving the motor 50 in one direction and the other for driving it in an opposite direction.

Triac semiconductor circuits for controlling AC power to a load, which are well-known in the prior art, include a triac semiconductor capable of conducting current of either polarity to the load from a power source when a control signal of sufficient magnitude is present at a control gate electrode of the triac. A logic "1" signal at the gate electrode can provide a signal of such sufficient magnitude, while a logic "0" signal does not.

The triac circuit 52 receives 60 Hz AC voltage from a power line terminal 56. Each half-cycle of line voltage is either applied to the motor 50 or not applied, depending upon whether a binary control data signal at an input terminal 58 presents a logic "1" signal or a logic "0" signal to the triac circuit 52. The control data signal at the terminal 58 is derived from one of the binary stages of a data storage register, such as register 38, and is present before the beginning of the next two half-wave lobes of the AC voltage at the terminal 56. The other triac circuit 54, which is for operating the bidirectional motor 50 in the opposite direction, is identical with the circuit 52, and receives its control signals at a terminal 60 from another binary stage of the data storage register 38. The duration of the signals applied to the triac gates is easily made more than five times greater than the duration of each individual command signal on the cable 24.

The data in the registers 38, 40, . . . 46 located at the printing press, are refreshed or replaced only during a particular phase interval of the AC voltage of the terminal 56. As shown in FIG. 3, which depicts one complete cycle of the AC voltage at the terminal 56, a data refresh period 62 extends between phase angles of 150° to 180°. At a phase angle of 180°, a triac turns off it it had previously been conducting.

In order for the motor 50 to develop full torque during the negative lobe 66 of the line voltage, that is, between the phase angles 180° to 360°, it is necessary for the gate electrode 58 of the triac circuit 52 to experience a sufficient gating signal in a phase interval 64 of 30° duration extending from 180° to 210°. When, as in the present apparatus, the control data is refreshed immediately prior to 180° the necessary new control signal is available at the input terminal 58 in ample time to trigger the triac circuit 52 to develop full torque for the negative lobe 66 of the power line voltage of FIG. 3. The same data serves to trigger the triac during a phase interval 70 of 0° to 30° of a next succeeding cycle, for conduction of a positive lobe 72 of AC voltage to the motor 50.

In the event that the logic signal that is inserted during the refresh period into a particular stage of the register 38 is a "0," the corresponding triac is not triggered into conduction during the two immediately following half-cycles of the line voltage. When neither the inward triac circuit 52 nor the outward triac circuit 54 receives a logic "1" signal from the data register 38, the motor 50 is idle for the next-following cycle of line voltage, and the corresponding ink key 48 remains stationary.

Logic circuits are employed at the printing press to steer various portions of the serial data train received on the cable 24 to the various data registers corresponding to the respective printing units. As shown in FIG. 4, the first printing unit 12 has an ink fountain 74 which is controlled by ink adjustment keys 48 under the control of actuators 26. The storage register 38 is a shift register having a 128 bit capacity. Alternate ones of the 128 bits are for storing commands to move the ink keys in an inward direction and the others are for storing commands for the outward direction.

The shift register 38 has an input terminal 76 for receiving serial data from a portion **24*a* of the cable 24, and also has a clock input terminal 78. A succession of pulses must be applied to the clock input terminal 78 in order for the shift register 38 to accept the data stream at the terminal 76 and to shift it successively through the shift register 38 to fill the register. The clock pulses are received at the printing press on a portion 24*b* of the cable 24, and are connected to an input gate 80 of printing unit 12 and in parallel therewith to similar input gates, such as gate 88, for the other printing units. Clock pulses are blocked by the gate 80 when a data pattern corresponding to a printing unit other than the first unit 12, exists at three decoding input terminals 80*a*. Conversely, clock pulses are transmitted through the gate 80 to the terminal 78 of the shift register 38 when the currently transmitted data of the serial data train are intended for the first printing unit 12, because during that interval an enabling pattern of signals corresponding to that printing unit is applied to the terminals 80*a***.

Steering signals are successively applied to the terminals of gate 88 and to terminals of corresponding gates for the other printing units. Each logic gate such as gate 80 receives, in addition to the clock signal, three binary input signals, corresponding to a unit's digit, a two's digit, and a four's digit, on three lines **24*c*, which are part of the cable 24. The binary data on the lines 24*c* changes in successive steps from 7 to 0 to indicate respectively that the data currently being applied to the lines 24*a* relate to the printing units in order of descending number from the eighth to the first. In the current example, eight printing units, 12, 14, . . . 20 are employed. The logic gates 80, . . . 88 in this way, steer successive 128 bit portions of the entire 1024 bit data train to the appropriate shift registers 38, 40, . . . 46** in orderly succession with the higher numbers first. Each data train has provision for transmitting up to eight times 128 bits or 1024 bits, and thereby controlling 512 ink keys, an entire train being transmitted 60 times per second.

At the remotely located control console 22, FIG. 5, manual switches 30, 32, are connected with an electronic clock, a scanner, and other logic circuits to produce the serial data train, the clock signal, and the steering signals that are required for the press. The manual switches 30 include an array of manual switches **30*a* corresponding to individual ink adjustment keys and an all in-all out switch 30*b* for manually commanding all of the ink adjustment keys 48 of a selected printing unit to move in one direction or the other. The number of manual switches 30** that are provided is sufficient for controlling only one printing unit at a time.

During a manual mode of operation, one or more of the manual switches 30*a* are depressed and held down by the operator to adjust respective ink keys. All of the manual switches 30*a* are scanned by a 128 position scanner 94, which is a multiplexer for converting parallel data from the keys 30*a* to serial data at an output terminal 94*a* of the scanner 94. The serial data thus produced is transmitted through a logic AND gate 96 during a time interval in which the AND gate 96 is enabled by a logic "1" signal at an enabling input terminal 96*a*. When the AND gate 96 is enabled, 128 successive bits of data describing the positions of the manual switches 30*a* are transmitted through an OR gate 98 to the data lines 24*a*, and thence, to the printing press 10.

The scanner 94 successively samples the position of each of the keys 30*a* in turn, because of addressing signals received on seven parallel data lines 99 from a master counter 100. The master binary counter 100 counts pulses being received at an input terminal 100*a* from a 500 KHz clock oscillator 102, which is synchronized with the 60 Hz power line frequency of the terminal 56 at a terminal 102*a* of the clock. Each pulse subtracts one unit from the contents of the master counter 100, which therefore counts downward so that the highest numbers occur first. The entire contents of the ten bit master counter 100 are recycled successively. Consequently, the seven least significant bits, which control the scanner 94, are recycled through the 128 binary numbers 127 to 0. The scanner 94, the master counter 100, and the clock oscillator 102 are conventional components that are well-known in the prior digital circuit art.

The printing unit which is to be manually controlled is selected by the unit selection pushbuttons 32*a* of FIG. 4, which are connected to terminals A of a comparator 32*b*. The comparator 32*b* also receives signals from the master counter 100 and creates an enabling signal at the terminal 96*a* at the same time that the selected printing unit is being addressed at the printing press, in the following manner. The three most significant bits of the count in the master counter 100 identify one printing unit from among a maximum of eight printing units. These three successively changing bits are conducted on the lines 24*c* to control the steering of data into the appropriate shift registers 38 to 46 at the printing press 10. At the same time, the same three bits are applied to the B input terminals of the comparator 32*b* to scan the possible selections of printing units. When the data at the B input terminals exactly match the manual data standing at the A input terminals of the comparator 32*b*, the comparator 32*b* produces an enabling logic "1" signal at its output terminal, which is connected to the enabling terminal 96*a* of the AND gate 96. During the existence of the enabling signal at the terminal 96*a*, the positions of the manual switches 30*a* are transmitted in serial fashion into the currently addressed storage register, such as register 38, at the printing press 10.

When the operator wants to drive all of the ink keys 48 of a particular printing unit in the same direction simultaneously, for example in the inward position for less ink flow, he puts the all in-all out switch in an "all in" position. This switch has three positions: all in, off, and all out. When held in its all in position, the all in-all out switch 30*b* transmits the least significant bit of the master counter 100 to a signal terminal 104*b* of an AND gate 104. The gate 104 is enabled at another terminal 104*a* by a signal from the comparator 32*b* at the same time that the unit which is selected at the unit selection pushbuttons 32*a* is being addressed by the decoder 90 at the printing press. This occurs 60 times per second. Each time, a stream of alternating "1" and "0" logic signals is transmitted from the output of the AND gate 104 through the OR gate 98 and the cable 24*a* into the selected one of the shift registers 38–46.

This puts alternating "1's" and "0's" into the 128 stages of the shift register of the selected unit, and all of the inward-direction triac circuits of that unit are gated thereby to drive the ink keys 48 inward. The data in the register, such as register 38, of the selected unit is refreshed 60 times per second so long as the all in-all out switch 30*b* is manually held in its all in position. In this way, the all in-all out switch 30*b* controls the actuators 26 manually, to drive all of the ink keys 48 of a selected unit toward more inward positions.

Similarly, when the all in-all out switch 30*b* is manually held in the all out position, a signal which is obtained by inverting the least significant bit from the master counter 100 is applied to the terminal 104*b*, and a stream of alternating "0's" and "1's" is inserted in a selected shift register at the press, with the "1's" being in the positions which activate the outward direction triac circuits such as the circuit 54, FIG. 2. These signals drive all of the ink keys 48 toward more outward positions.

If desired, a logic circuit can be provided to latch on all in-all out command so that the keys continue to move after the command switch 30*b* is manually released, until the keys arrive at one extreme or the other of their available range of travel.

Thus, the manual control circuits at the control console 22 are used for one selected printing unit at a time either to control individual ink keys or to move all of the ink keys in a selected direction. The scanner 94, the master counter 100, and the clock 102, constitute a parallel-to-serial converter which is one of the converters 36 of FIG. 1.

Figure 6:
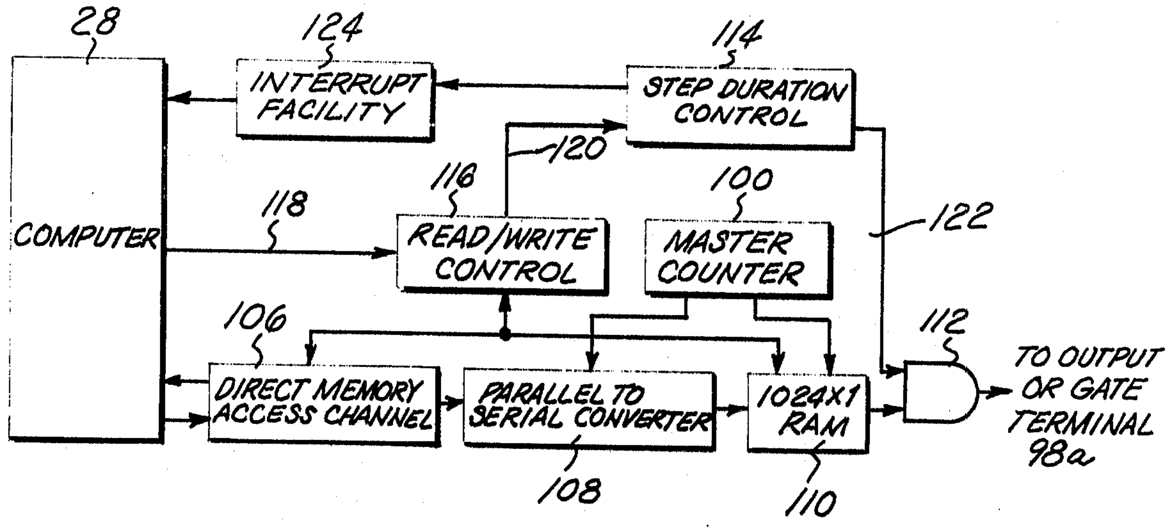
FIG. 6 is a block diagram of computer control portions of the control apparatus that are located at the remote control station.

When the ink fountains of the printing press are being controlled in an automatic mode of operation by the computer 28, the computer prepares command data and delivers it to temporary data storage circuits 34 from which it is transmitted to the press as a serial data train. FIG. 6 shows a direct memory access channel 106, a parallel-to-serial converter 108, and a 1024 bit random access memory 110, all of which serve as the temporary data storage means 34 of FIG. 1 to receive command data from the computer 28. The random access memory 110 cooperates with the master counter 100 to perform a parallel-to-serial conversion function and they constitute one of the converters of block 36 in FIG. 1.

The general concepts of the automatic or computer controls of FIG. 6 are as follows. Each complete set of command data that is prepared by the computer 28 is stored in the random access memory 110, and is transmitted to the printing units repeatedly during a predetermined time interval, after which the computer prepares a new set of command data. In the embodiment being described herein, all 1024 bits of the command data stored in the random access memory 110 are transmitted to the printing press repeatedly during a time interval before the computer 28 is called upon to prepare a new set of command data. A step duration control circuit 114 establishes the time interval during which a number of iterations of the complete data stream are transmitted to the press. When the time interval expires, the computer receives the signal to issue new command data to the random access memory 110.

The time interval is adjustable and can be preset for each press so that the duration of the step results in a desired increment of blade travel, for example 0.0001 inch. During the time interval established by circuit 114 the number of iterations of data stream that are transmitted may, for example, be 12. An output gate 112, when it is enabled by the step duration control circuit 114, transmits the serial data train of 1024 bits to the terminal 98*a* of the OR gate 98, for further transmission to the printing press.

A sequence of operation of the digital equipment of FIG. 6 begins with the computer 28 assembling a table of 88 words containing a total of 1024 bits of information. The bit arrangement in the table within the computer 28 has a one-to-one correspondence to the bit information that is later transmitted to the actuators 26 on the printing press. The first bit in the data table that is assembled within the computer provides for an "outward" movement command for the last actuator of the last printing unit 20; the second bit provides for an "inward" movement command for the last actuator of the last printing unit, and so forth.

When command information for the last unit 20 has been prepared in the computer 28, the computer sends a signal on a line 118 to a read/write control circuit 116 indicating that the new command data is ready for transfer out of the computer. The read/write circuit 116 thereupon activates the direct memory access channel 106. The access channel 106, which includes a storage register, reads eleven data words out of the computer 28 into its storage register, the eleven data words containing information for controlling only the last printing unit. The data in the direct memory access channel 106 is then serialized by the parallel-to-serial converter 108, under control of the master counter 100, and is written into the random access memory 110. Memory addressing of the random access memory 110 is also controlled by the master counter 100, so as to maintain it in absolute synchronization with other portions of the system.

The direct memory access channel then reads eleven more data words from the computer into its register, this group of eleven words representing instructions for the next-to-last printing unit. The parallel-to-serial converter 108 serializes the new data as before, and writes it into a second group of locations in the random access memory 110. The steps of reading groups of eleven data words from the computer and serializing them are repeated until command information for all of the printing units is stored in the random access memory 110.

Continuing the sequence of operation, as soon as the random access memory 110 contains a complete set of command data, the read/write control 116 transmits a drive command to the step duration control 114 on a line 120. The step duration control 114, by means of a conductor 122, enables the serial data output from the random access memory 110 to pass through the gate 112 and hence to be transmitted to the printing press 10.

During each transmission of the command data train to the printing press, the master counter 100 addresses each of the 1024 bit locations of the random access memory 110 in sequence, to produce the serial data stream of 1024 bits. A new transmission of 1024 bits starts at each period of the power line frequency, and the same data is transferred repeatedly from the random access memory to the registers such as register 38 on the printing press. Each transmission of a data stream requires approximately 2 milliseconds because 1024 bits are transmitted at a rate of 500 KHz.

The step duration control 114, by its timing action, determines the number of times that the complete 1024 bit data stream is transferred to the press, as described above. After the time interval or step has been completed, the output from the random access memory 110 is disabled by the step duration control 114. At that time the step duration control also signals the computer 28 via an interrupt facility 124 that a step has been completed, after which the step duration control 114 stops to wait for further instructions. The computer then repeats the foregoing sequence of events, starting again by assembling a new table of 88 words as described above.

To summarize the computer-controlled mode of preparing command data, the computer 28 prepares a complete set of command data for all of the actuators of all of the printing units and puts that data into temporary storage 110. The complete set of data is then serialized and transmitted to the printing press for the predetermined step duration. The computer 28 then provides a new set of command data and the sequence is repeated.

While the multiplexing scheme outlined in this patent is applicable to the control of various types of actuators mounted on the press, the invention is described in the preferred embodiment as controlling ink fountain key actuators, in the interest of providing a specific example.

Although in the preferred embodiment described above, the data stream is transmitted to the press at a 60 Hz repetition rate, other rates could be employed. One alternative embodiment would employ a 120 Hz rate of data repetition, and would control dc devices such as the actuators, with the triac circuit described above, by dropping appropriate bits from alternate bit streams depending upon the polarity of drive voltage (direction) that is desired.

In a preferred embodiment of the invention, position-sensing transducers are provided at the ink fountains to produce signals indicative of the actual positions of the individual ink keys. The position-sensing transducers can be potentiometers. The signals which they produce are transmitted to the computer 28 to supply feedback data regarding ink key positions, for control purposes. All of the feedback signals are multiplexed onto a few electrical conductors for transmission from the press to the computer 28. Preferably, but not necessarily, the multiplexing system for the feedback signals is similar to the multiplexing system for command signals described in detail above, and uses some of the same components in common.

From the foregoing, it can be seen that the embodiment disclosed has means for selecting an actuator or actuators to be adjusted and establishing command data for effecting energization of such actuators. Such means include, in the embodiment illustrated in FIGS. 4 and 5, the manual switches 30 and the unit selection push buttons 32*a*, the comparator 32*b*, and the master counter 100. It will be noted that the unit selection push buttons 32*a* and the comparator 32*b* are utilized due to the fact that there are a plurality of printing units having actuators to be adjusted rather than a single printing unit. In addition, the embodiment of FIGS. 4 and 5 includes a means for loading the command data in the register in the form of the parallel to serial converter 36, which includes the position scanner 24, as well as the gates 96, 98 and gates 80–88 at the various units. It will be noted that the scanner 94 provides a means for reading the setting of the switches on the table and transmitting the settings thereof serially to the shift registers at the printing press.

Moreover, it will be noted that the gates 80–88 have a clock input for applying a clock pulse to the shift terminal of the register which effects the setting of any stage of the shift register to zero when there is no data, i.e., or binary 1, on the data input over line 24*a* commanding movement of the actuator. Accordingly, there is a means provided for setting each shift register to command no movement when there is no command on the data line 24*a* commanding movement. It will be appreciated from the foregoing specification that in the data train there will be a combination of binary 1's and binary 0's. The binary 0 commands no movement and is a low signal, while the binary 1 is a high signal. As is well known in shift registers, the binary 0 is the same as far as a shift register is concerned as no signal on the data input of a shift register so that the shift pulse when it occurs shifts a zero into the register for the particular data period.

It will be further noted that the triac circuits 52 and 54 constitute switching devices in the form of semiconductors which are responsive to the data (binary 0 or binary 1) set in the corresponding shift register and constitute a switching means for selectively energizing the motor 50 of each actuator during successive cycles of the A.C. power. This switching means is responsive to the data set in the portion of the register corresponding to the actuator to effect a substantially fixed increment of movement during each cycle when movement is commanded by the data. The manual switches 30, the manual unit selection 32, and the parallel serial converter 36 together with the gates 80–88 constitute a means for cyclically loading each of the storage registers in synchronism with the duty cycle of the switching circuits. The master counter together with the comparator 32*b* and the gate 96 constitutes a means for addressing the various storage registers in sequence.

What is claimed is:

1. Apparatus having a plurality of actuators, each comprising a movable mechanical part, said actuators being individually operable to vary an operating condition of the apparatus, said apparatus being arranged in a plurality of groups with each group having a plurality of said actuators therein and each of said groups having a respective binary data shift register with the respective shift register having data storage portions each of which correspond to an individual one of the actuators, each data storage portion being settable to selectively indicate movement of the respective actuator or no movement of the actuator, a control station remote from said actuators, a data transmission line for serially transmitting data to said shift registers from said control station and connected to each of said registers, addressing means for cyclically addressing each of said storage registers in sequence, register loading and control means associated with each of said shift registers and each connected to said addressing means and to said data transmission line for loading the associated shift register when addressed by said address means and operable to set said register to indicate no movement of the corresponding actuators in the absence of data on said data transmission line for the shift register, data means at said remote control station for establishing command data for commanding movement of one or more selected actuators within a selected group during each addressing cycle while such command data is established, and transmitting means operating in synchronism with said addressing means to transmit established command data during each addressing cycle when the selected register is addressed, whereby said addressing means and said transmitting means and said loading and control means are operable to refresh or change the data in the selected register during each cycle of said addressing means independently of sensing the position or movement of the actuators, and means connecting each of said actuators of a group to its respective data portion of the corresponding shift register for effecting a fixed increment of movement of the actuator during the cycle time between successive addressing of the shift register by said addressing means when commanded by the data in the respective data storage portion.

2. Apparatus having a plurality of actuators, each comprising a movable mechanical part, said actuators being individually operable to vary an operating condition of the apparatus, said apparatus being arranged in a plurality of groups with each group having a plurality of said actuators therein and each of said groups having a respective binary data shift register with the respective shift register having data storage portions each of which correspond to an individual one of the actuators, each of said data storage portion being settable to selectively indicate movement of the respective actuator or no movement of the actuator, a control station remote from said actuators, a data transmission line for serially transmitting data to said shift registers and connected to each of said registers and said control station, address means for cyclically addressing said storage registers in sequence, an address gate for each of said registers connected to said addressing means, first means for supplying clock pulses to said shift registers connected to each of said address gates to supply clock pulses to shift the corresponding shift register when said addressing means conditions the address gate, data means at said remote control station for establishing binary data to be loaded into a selected one of the registers, second means at said control console for cyclically providing a serial stream of the data established at said control console in synchronism with said addressing means to output the data each time a register is addressed including means coupled to said addressing means and to said data transmission line to effect the transmission of data outputted from said data means to a selected register in synchronism with the addressing of said register by said addressing means and blocking data transmission when said addressing means is addressing a non-selected register, said addressing means and clock pulses and data transmission means operating to refresh or change the data in each register during each cycle of said addressing means independently of sensing the position or movement of the actuators, and means connecting each of said actuators of a group to its respective data storage portion of the corresponding shift register and for effecting a fixed increment of movement of the actuator during the cycle time between successive addressing of the shift register by said addressing means when commanded by the data in the respective data storage portion.

3. Apparatus for remote control of a plurality of actuators and comprising:

a data storage register having a plurality of stages for receiving and storing data for controlling the actuators with each of the actuators having at least one corresponding stage in said register for receiving and storing data commanding fixed incremental movement of the actuator or no movement;

energizing means corresponding to each actuator and each having a cyclical operation and responsive to data stored only in the said stages corresponding to said actuator for in each operating cycle producing a fixed increment of movement of the corresponding actuator when data commanding movement is stored in the corresponding stage and producing no movement of the corresponding actuators when data commanding no movement is stored;

a remote control station for establishing or maintaining the data for each actuator, which data is to be stored in each stage of said register for each cycle of operation of the actuators controlled thereby in which an incremental movement of an actuator is to occur, and controllable for any cycle of operation to selectively change the data established or maintained for any actuator whereby the data for any actuator may be changed for any cycle;

transmitting means for transmitting the said data established or maintained at said control station in each operating cycle in which an incremental movement is to occur to reload or refresh said register, comprising means for transmitting the data serially from the remote station in each operating cycle in which an incremental movement is to occur; and, timing means for activating the transmitting means to load or refresh said registers in a predetermined time interval in each actuator operating cycle of the actuators controlled thereby to transmit said data to produce resulting fixed incremental movement of any selected actuator to each operating cycle, whereby movements greater than said fixed increment of movement are accomplished through repeated transmission of said data to refresh the storage register to command movement in successive operating cycles.

4. Apparatus as set forth in claim 3 wherein said remote control station comprises a remote control panel having a plurality of manually operable switches thereon, each switch corresponding to a respective actuator and each operable independently of the others to selectively establish data commanding movement or no movement of said corresponding actuator, and further wherein said transmitting means comprises means responsive to said data established by said switches for transmitting the data serially from said remote control station to said register in each operating cycle in which an incremental movement is to occur.

5. Apparatus as set forth in claim 3 for remote control of a printing press wherein each of said actuators are actuators for adjusting movable ink flow control members of said printing press.

6. Apparatus for remote control of a plurality of actuators arranged in a plurality of groups with each group having a plurality of actuators therein and comprising:

a plurality of data storage registers, each register being associated with a respective group of actuators and each having a plurality of stages for receiving and storing data for controlling the actuators of the associated group with each of the associated actuators having at least one coresponding stage in said register for receiving and storing data commanding fixed incremental movement of the actuator or no movement;

energizing means corresponding to each actuator and each having a cyclical operation and responsive to data stored only in the said stages corresponding to said actuator for in each operating cycle producing a fixed increment of movement of the corresponding actuator when data commanding movement is stored in the corresponding stage and producing no movement of the corresponding actuator when data commanding no movement is stored;

a remote control station for establishing or maintaining the data for each actuator of at least one group of actuators, which data is to be stored in each stage of a corresponding at least one of said registers for each cycle of operation of the actuators controlled thereby in which an incremental movement of an actuator is to occur, and controllable for any cycle of operation to change the data established or maintained for any actuator, whereby the data for any actuator may be changed for any cycle;

transmitting means for transmitting the said data established or maintained at said control station in each operating cycle in which an incremental movement is to occur to reload or refresh said register, comprising means for transmitting the data serially from the remote control station in each operating cycle in which an incremental movement is to occur and for transmitting identifying signals to identify the group of actuators to be controlled by the data being transmitted;

means for steering each respective portion of said data to a respective one of said data storage registers in accordance with said identifying signals; and, timing means for activating the transmitting means to load or refresh said registers in a predetermined time interval in each actuator operating cycle of the actuators controlled thereby to transmit said data to produce resulting fixed incremental movement of any selected actuator in each operating cycle, whereby movement greater than said fixed increment of movement are accomplished through repeated transmission of said data to refresh the storage register to command movement in successive operating cycles.

7. Apparatus as set forth in claim 6 for remote control of a printing press having a plurality of printing units, wherein each of said plurality of groups of actuators and its respective data storage register are associated with a corresponding printing unit, and wherein each of said actuators is an actuator for adjusting a movable ink flow control member of said corresponding printing unit.

8. Apparatus as set forth in claim 6 wherein said remote control station comprises a remote control panel having group selection means thereon for selecting a group of actuators to be controlled and also having a plurality of manually operable switches thereon, each switch corresponding to a respective actuator of the selected group of actuators and each operable independently of the others to selectively establish data commanding either movement or no movement of said corresponding actuator, and further wherein said transmitting means comprises means responsive to said group selection means for transmitting identifying signals to identify the selected group of actuators, and further responsive to said data established by said switches for transmitting the data serially from said remote control station in each operating cycle in which an incremental movement is to occur.

* * * * *